United States Patent [19]

Tezuka et al.

[11] Patent Number: 4,560,622
[45] Date of Patent: Dec. 24, 1985

[54] STEEL FIBER FOR REINFORCING CONCRETE AND PRODUCTION THEREOF

[75] Inventors: Yoshitomo Tezuka, Hachioji; Takeo Nakagawa, Kawasaki; Kazusuke Kobayashi, Sagamihara, all of Japan

[73] Assignee: Aida Engineering, Ltd., Kanagawa, Japan

[21] Appl. No.: 644,656

[22] Filed: Aug. 27, 1984

Related U.S. Application Data

[60] Continuation of Ser. No. 325,765, Nov. 30, 1981, abandoned, which is a division of Ser. No. 12,740, Feb. 16, 1979, abandoned.

[30] Foreign Application Priority Data

Feb. 22, 1978 [JP] Japan .................................. 53-19259

[51] Int. Cl.⁴ .................................. C04B 31/18
[52] U.S. Cl. .................................. 428/599; 428/600; 106/99
[58] Field of Search .................... 106/99; 52/659, 720; 264/271.1; D25/98; 75/251; 428/599, 600, 602, 603, 605, 606, 612, 544, 923

*Primary Examiner*—L. Dewayne Rutledge
*Assistant Examiner*—John J. Zimmerman
*Attorney, Agent, or Firm*—Armstrong, Nikaido, Marmelstein & Kubovcik

[57] ABSTRACT

The present invention is concerned with a steel fiber for reinforcing concrete. The steel fiber according to the present invention is a needle-shaped chip resulting from directly machining a steel ingot material. The fiber has a wrinkled surface with a plurality of rugged waves along the length of the fiber. This new production employs a plain milling cutter having a plurality of cutting edges of negative rake angle and twist angle with respect to an axis of the cutter for machining the ingot material by a down-cut milling under conditions of high speed and short depth of cut.

3 Claims, 21 Drawing Figures

FIG_1
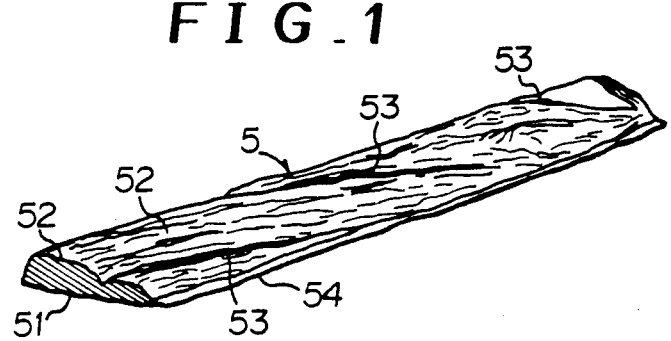
FIG_6
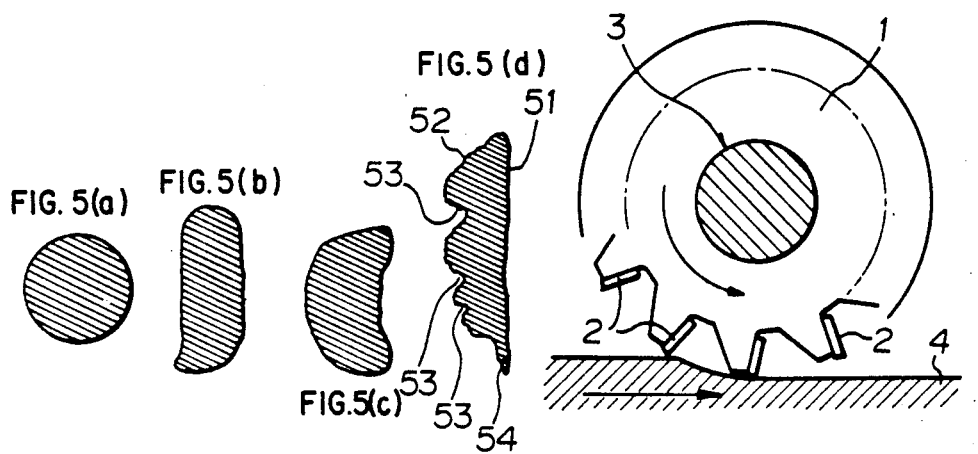
FIG_7
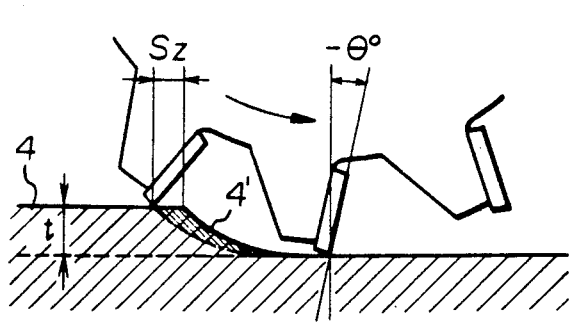
FIG_8
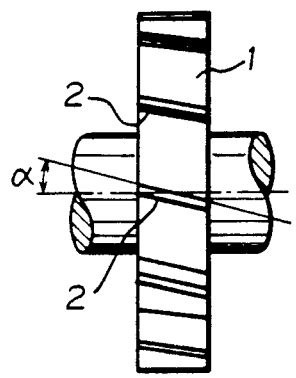

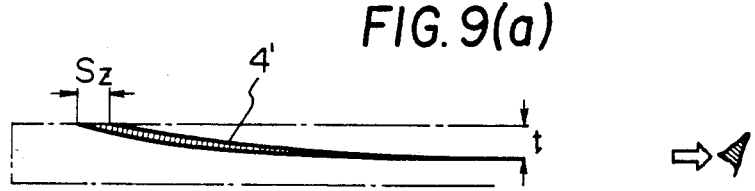
FIG. 9(a)
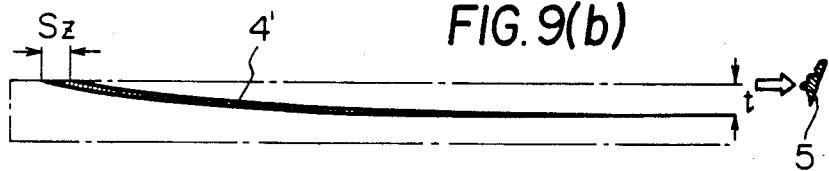
FIG. 9(b)
FIG. 12
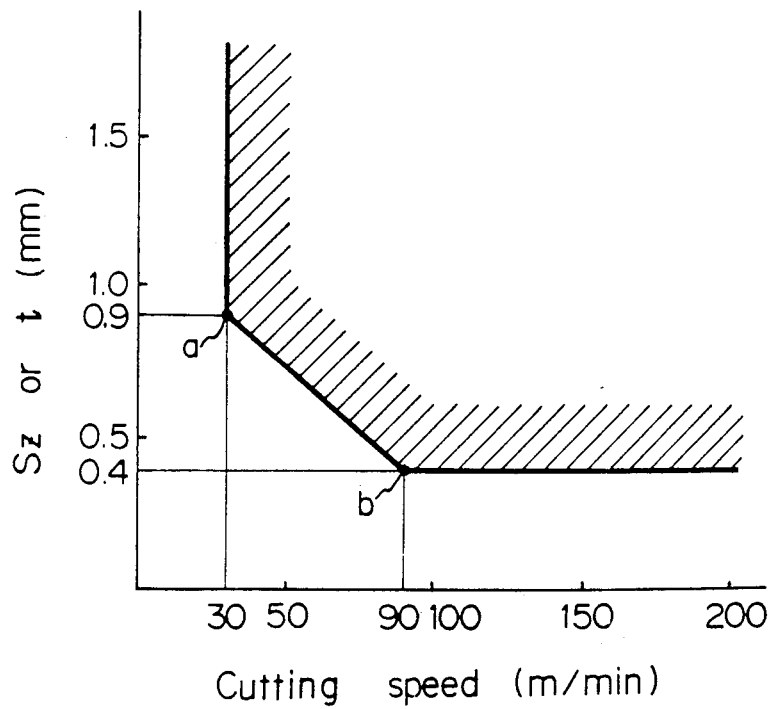

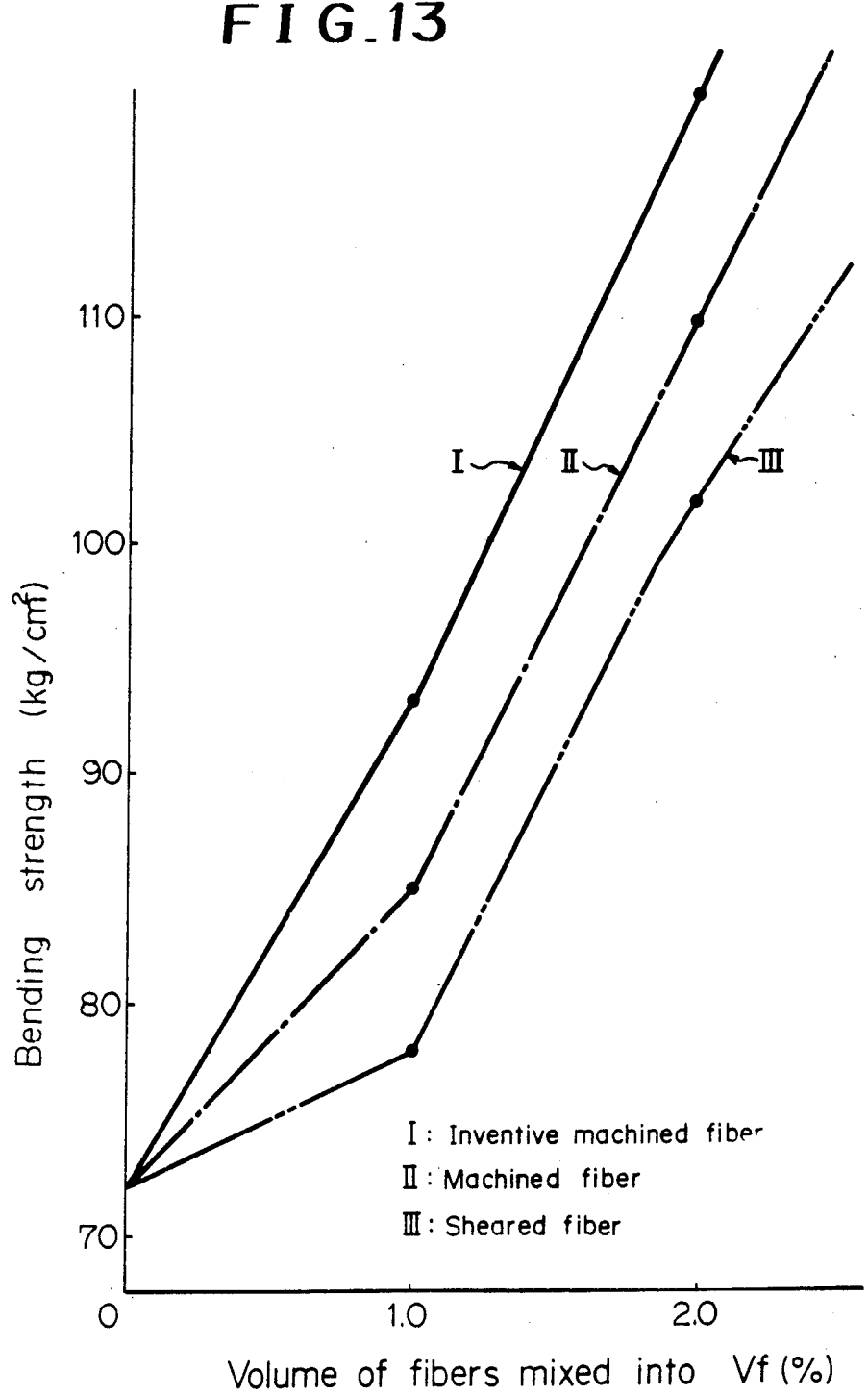

STEEL FIBER FOR REINFORCING CONCRETE AND PRODUCTION THEREOF

This application is a continuation of application Ser. No. 325,765, filed Nov. 30, 1981, now abandoned, which is a division of application Ser. No. 012,740, filed Feb. 16, 1979, also abandoned.

BACKGROUND OF THE INVENTION

The present invention relates to steel fiber for reinforcing concrete.

A concrete reinforced by uniformly mixing or scattering short length steel fibers is superior in the tensile strength, bending strength, cracking load, toughness, shock resistance and other properties to unreinforced concrete. Thus, the industrially concerned field has recently paid attention to how to produce the same.

Strengthening characteristics of the steel fiber reinforced concrete depend on properties of the steel fiber to be mixed, and therefore in this regard the steel fiber of the short length excellent in the reinforcing effect has been expected.

Glass fiber or plastic fiber as the short length fiber have been tried, but from viewpoint of various usage or shock-resistability, steel fiber is in general used. There are three kinds of the steel fibers, roughly divided by the production processes as follows.

(a) Steel fiber is cut from wire to the required length.
(b) Slit cold rolled steel sheet whose width corresponds to length of the fiber is chopped by a rotating cutting edge or a pressing mill.
(c) A disc is rotated on molten steel to extract molten steel.

However the steel fibers by the above mentioned processes are not satisfactory. The steel fibers produced by the (a) process of cutting the steel wire and the (b) process of shearing the steel sheet are around (a), square or rectangular (b) in cross section. Since the surfaces are smooth or flat, surface areas are not further widened and therefore it is necessary to increase the amount of the steel fiber mixed into the concrete. The cost charged for the concrete structure becomes high, accordingly. In these circumstances, it is practised to crush the fiber at its both ends or bend it in the center in order to heighten adhesive force to the concrete, but the production steps increase as much and the production cost would become high since much processed raw materials are used. In addition, notwithstanding such additional processings, when mixing into and agitating the fibers in the concrete, the fibers get entangled with each other owing to the crushed or bent portions, thus creating ball-like lumps. The fibers are not uniformly scattered therein. Intentional roughening of the fiber creates cracks and ridges which serve as notches and cause it to be broken thus decreasing the strengthening characteristics. Further since the steel wire material and the steel sheet are used with lubricant during their production, the oil film still remains on the surfaces of the product fibers, which is one of the causes which weaken the adhesion to the concrete matrix.

In the process (c), the fiber is extracted from the molten steel by a water cooled rotating disc. The rotating disc has split spiral screws on its surface, and the molten steel touched at the ridge of the screw is instantly cooled. Thus, the fibers obtained are not uniform in cross section and are lacked in reliability of the adhering property and are inferior in the strengthening characteristics.

In view of such circumstances involved in the prior art, the present invention has as an object to provide improved steel fiber for reinforcing the concrete.

It is an object of the invention to provide steel fiber which is excellent in the strengthening characteristics and the adhering property to the concrete, and may lower the amount necessary to be mixed into the concrete.

It is another object of the invention to provide steel fiber which is well conditioned in dispersion without making fiber balls when mixed into and agitated in the concrete by means of mixer.

It is a further object of the invention to provide steel fiber which may be decreased in the rate of mixing into the concrete and does not need a separator required for using the ordinary steel fibers, and which may lower increasing of the load generated at mixing, thereby to shorten the agitating period of time.

It is a still further object of the invention to provide steel fiber whose surface is covered with oxidized film in blue having an anti-corrosive effect.

It is another object of the invention to provide an improved process which industrially and most effectively produces steel fiber having the above mentioned characteristics at cheap cost.

BRIEF DESCRIPTION OF THE INVENTION

The steel fiber for reinforcing concrete according to the present invention is a needle shaped chip resulted from directly machining the steel ingot material by means of the milling cutter. The fiber has wrinkles or furrows over the free side surface thereof, and these wrinkles are formed with a plurality of rugged waves running to the fiber length, the cross section of which is as a whole uneven like mountain ranges.

The surface of rugged waves is, in other words, formed with stripe patterns having difference in height. It is preferable that the wave is almost parallel along the fiber or oblique with respect to the length of the fiber, or that the wave runs obliquely end-to-end of the width as if it were a diagonal node, and it is preferable that the cross section of the fiber in general falls within the range between 0.1 mm$^2$ and 0.5 mm$^2$ in view of the relation of feed×depth of cut per one cutting tooth.

Thus, it should be noted that the steel fiber of the invention is absolutely different from scraps ordinarily gained from machining the steel material for shaping determined figures. Such scraps are of filings or swarfs of less close fabrication, not forming fibers, or curved, curled in spiral. Those machined scraps could not satisfy factors of the strengthening characteristics, adhering properties to the concrete matrix, uniform scatterings therein, which are of importance as the steel fiber for reinforcing the concrete. In addition, the scraps are insufficient with close fabrication, inferior in the bending rigidity, hardness, yield point, especially low in the tensile strength which is important to the reinforcing effect of the concrete, or subject to breaking owing to the bending load at mixing, resulting in losing a desired strengthening effect. Further, those are unsatisfactory in the adhesive property, inuniform in scatterings and easy in making ball like lumps.

On the other hand, the steel fiber produced by the present invention is a needle shaped chip of a mountain range cross section which is made by gathering and tying up the surface layer of the ingot material by the plastic flow caused at the machining operation, and it has considerably high hardness by the workhardening, and the rigidity is high on the surface by the tempering. Therefore it has the tensile strength more than that of the steel fiber sheared from the thin sheet and also has the excellent characteristics in the bending rigidity, hardness and yield point.

Besides, the steel fiber by the invention has outstanding features that it has fine wrinkles all over the surface formed with rugged waves running along the fiber. Therefore, the present steel fiber has the surface area larger than those of the fibers cut from wire, sheared from the thin steel sheet or the scrap resulted from the ordinary machining operation. This feature becomes more prominent as the number of the waves increase. Due to the large surface area and many ruggednesses, the adhesive force at mixing into the concrete is heightened to elevate the reinforcing effect. Especially in a case that the rugged waves run obliquely with respect to the axis of the fiber, the slip-out resistance is enhanced. Since the wave runs along the fiber length as said, the problems as seen in other kind of the fiber which are post-processed to make unevenesses on the surfaces by which unevenesses cause brittleness. That is, the steel fiber of the invention can be improved in the adhesion force in the concrete matrix without spoiling the strengthening characteristics of the concrete. The invention also includes such steel fiber the entire body of which is twisted in the axial direction of the fiber. This kind of steel fiber is further heightened in the slip-off resistance due to the said twist and the above mentioned rugged waves.

The inventive steel fiber has the rugged waves running to the axis of the fiber, and it is considered that the fibers are mixed at random direction three-dimensionally. From this viewpoint, when mixing with the concrete by the mixer, the fibers are very good in uniformly scattering without making fiber balls. Accordingly, there would not be partial weak spots in the concrete products, and the fibers to be used may be mixed efficiently.

The above mentioned various characteristics are the most suitable in use and the most efficient in production when the fibers have the cross sections falling within the range between 0.1 mm² and 0.5 mm² in the relation of feed×depth of cut per one cutting tooth.

Since the said inventive steel fiber has the high strength, adhering property and uniform scattering, the reinforcing effect of the concrete is marked on one hand, and the amount of mixing the fibers may be curtailed on the other hand. As it is said that the expensive cost of the steel fiber caused the neck to prevalence of the steel fiber reinforced concrete, the curtailment of the mixing rate is very significant to the simplification of the practising facilities and the processes with a result of reducing the amount of using the concrete. The uniform scattering is relative with the strengthening effect, and the load to the mixer is greatly reduced to shorten the mixing period of time. These merits are concerned with the economics of the facility and with curtailment of the labor.

With respect to a production of the steel fiber for reinforcing the concrete according to the present invention, the steel ingot material is directly machined by the cutter to produce needle shaped chips. For the cutter, a plain milling cutter of a large diameter is employed whose cutting edge has the negative rake angle and a twist angle to a driving shaft of the cutter. The ingot material is machined under conditions of a down-cut milling at high machining speed and thinner depth of cut. This is quite different from the conditions of the ordinary milling cutter where the vertical direction to the plane is an axial direction of a fiber. In the ordinary process of machining the material by the plain milling cutter into a shape of determined size, it is recommended that the rake angle of the cutting edge is positive (plus angle), the cutting width is narrow, and the cutting and the feed are large. In these conditions, the chips are brittle swarfs instead of the needle shape as aforementioned. When mixing, the concrete becomes heavy at most and does not heighten its strength.

According to the above mentioned conditions, the thin surface layer of several ten microns of the ingot material is gathered and tied up by the plastic processing per each of the cutting teeth to turn out straight needle like chips where the strength is heightened in comparison with the initial sheet by workhardening due to the large plastic deformation caused at machining. Since the cutting edge of the milling cutter has the negative rake angle and the twist angle to the axis of the cutter, a large resistance is added at machining and the fiber is provided with tempering phenomena on its surface to increase rigidity in the fiber.

When the ingot is machined at the high speed by the down-cut milling under the conditions of the negative rake angle between 0° and −30°; the twist angle between 0° and 60°; the relationship between the feed per one cutting tooth $Sz$ and the depth of cut $t$; either $Sz$ or $t$ between 0.1 mm and 2.0 mm in the range of $Sz \times t$ being 0.1 to 0.5 mm²; and either $Sz$ or $t$ of more than 0.4 mm, the cross section of the fiber is in average made wide and thin and the free side surface other than the side contacting the rake face of the cutting edge is all-over formed with the fine wrinkles with the rugged waves running along the axis of the fiber. By changing the twist angle $\alpha$ of the cutting edge, such waves may be formed which are not only almost parallel to the axis of the fiber but also acute in the said obliquity. In this regard, the wave can be changed in size (degree of ruggedness at disposal by adjusting any or all of the cutting speed V, the rake angle $\theta$ of the cutting edge and the diameter D of the cutter.) The production by the invention is easy, because of the simple facility, the cheap starting material of the less processed ingot, the high producing speed, no post-processing required for improving the adhering property to the concrete matrix. Therefore, the great number of the steel fibers of 1,000,000 to 3,000,000 pieces for 1 m³ concrete can be produced at a low cost.

BRIEF DESCRIPTION OF THE DRAWINGS

FIG. 1 is a partial perspective view of one example of the steel fiber for reinforcing the concrete according to the present invention;

FIG. 5(a), 5(b), 5(c) and 5(d) are in comparison between cross sections of the typical fiber according to the present invention and the conventional ones, wherein (a) is of the cut wire, (b) is of the sheared fiber, (c) is of the melt extracted fiber and (d) is of the inventive fiber;

FIG. 6 is a side view schematically showing a process of producing the steel fibers according to the present invention;

FIG. 7 is a side view showing a milling cutter employed in the production of the invention and the process thereby;

FIG. 8 is a front view of the milling cutter employed in the steel fiber production of the present invention;

FIG. 9(a) and 9(b) are explanatory views showing outlined surfaces of the steel ingots wherein the diameters of the milling cutter are differed;

FIG. 12 is a graph showing the optimum cutting range for forming the rugged waves in the steel fiber production by the present invention;

FIG. 13 is a graph showing the relation between the mixing rate and the bending strength in comparison of mixing into the concrete the steel fibers by the present invention and the prior art;

DETAILED DESCRIPTION OF THE INVENTION

Figure 2:
FIG. 2 and FIG. 3 are photographs showing embodiments of the steel fibers according to the present invention (4 magification)

The present invention will be actually discussed with reference to the attaching drawings. FIG. 1 to FIG. 4 show the steel fibers for reinforcing the concrete according to the present invention, and an entire body thereof is designated with a reference numeral 5.

The steel fiber 5 is a needle-like chip manufactured by directly machining the steel ingot on the surface in such a manner that, as shown in FIG. 6, a cylindrical milling cutter 1 provided with a plurality of cemented carbide blades 2 (plain milling cutting edges) on an outer circumference is rotated downwardly with respect to the ingot material 1 by a rotating shaft 3 inserted in center of the cutter, and simultaneously the cutter 1 is moved relatively with the ingot material 4, the steel fibers being included, irrespectively of axially or non-twisted ones.

Figure 3:
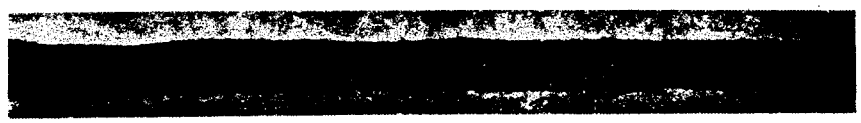
Figure 4:
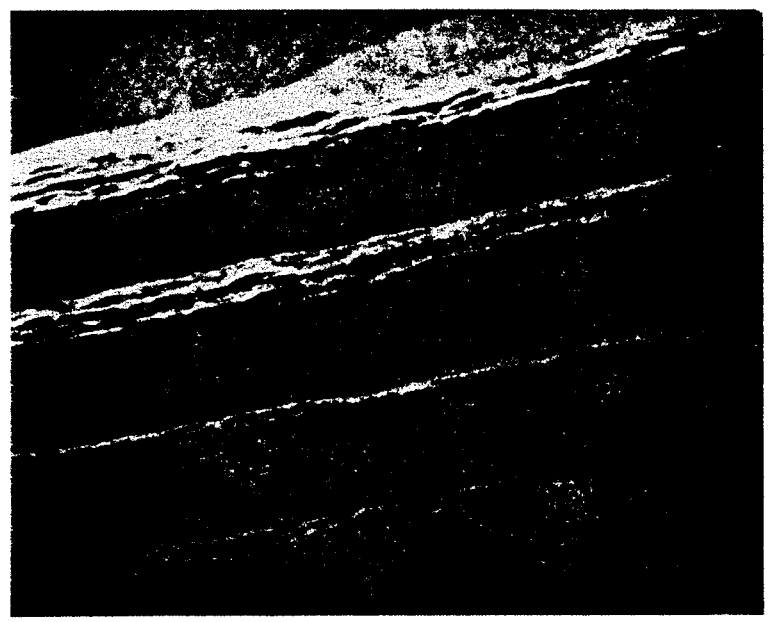
FIG. 4 is a microscopic photograph of enlarged surface of the steel fiber viewed in FIG. 3 (50 magni.)

The inventive steel fiber 5 is characterized by forming a flat face 51 on a part having contacted with the cutting edge 2, fine wrinkles or furrows 52 allover free side surface other than said cut part, and a plurality of rugged waves 53 running along the length of the fiber on the wrinkled surface, substantially deeper than the fine wrinkles. The waves having as a whole mountainous cross section of relatively uniform thickness and wide length width. The wrinkled surface 52 and the rugged wave 53 will be apparent from FIG. 3, too. The wave 53 is formed with stripe patterns having difference in height, and it may run almost in parallel with the axial line of the fiber as shown in FIG. 3 and FIG. 4, but it is recommended that the wave is, as shown in FIG. 2, remarkable in obliquity running end-to-end of the width of the fiber with respect to the axial line thereof. The twist waves in FIG. 2 or FIG. 3 can increase the slip-out resistance.

Desirable fiber has the wave of deep valleys and prominent ruggedness, whereby the surface area is widened to increase the adhesive property to the concrete matrix. FIG. 5(a) to 5(d) show the cross sectional shapes and the surface area ratio of the inventive steel fiber and the existing ones. It will be seen from FIG. 5 that the instant fiber has a peculiar shape, such that the flat face and the surface opposite the flat face when viewed in cross section form a long narrow shape which is tapered toward the flat face. Assuming that the surface area ratio of the (a) cut wire is 1.0, the (b) sheared fiber and the (c) melt extracted fiber have the ratios of 1.2 at best, and that of the (d) fiber by the present invention is as large up to 1.8. That is, comparing with the cut wire, the instant fiber has the surface area ratio of 1.8 times and comparing with the sheared one it is 1.5 times. In this regard, the fibers having the wrinkled surfaces without the rugged waves were 1.5 in the surface area ratio. Comparing with them, the fibers of the invention are more widened in the surface area. A reference numeral 54 shows a whisker like section formed at one side of the face 51.

The size of the cross section of the inventive fiber may be arbitrarily changed by a later mentioned $S_z$ or $t$, and $S_z \times t$ between 0.1 and 0.5 mm$^2$ is appropriate, taking the bending strength and production efficiency into consideration.

FIG. 13 shows the relation between the rate of mixing the steel fiber and the bending strength of the concrete reinforced with the steel fiber when mixing into the concrete matrix the steel fiber (I) with the rugged waves running obliquely with respect to the fiber length ($\theta = -15°$, $\alpha = 15°$, number z of cutting edge = 18, $D = 250\phi$, $V = 95$ m/min, $S_z = 0.8$ mm, $t = 0.3$ mm, material: mild steel); the machined steel fiber (II) without the rugged waves ($\theta = 0°$, $\alpha = 25°$ $D = 100$ mm$\phi$, $V = 30$ m/min, $S_z = 0.5$ mm, $t = 0.5$ mm, mild steel); and the sheared steel fiber (III) of the thin steel sheet of 0.5×0.5 mm.

The characteristics of the steel fibers (I) to (III) are shown in Table 1.

TABLE 1

|  | I | II | III |
| --- | --- | --- | --- |
| Cross sectional area A (mm$^2$) | 0.24 | 0.25 | 0.25 |
| Length L (mm) | 30 | 30 | 30 |
| Aspect ratio L/d | 55 | 55 | 55 |
| Tensile strength (Kg/mm$^2$) | 72 | 71 | 71.5 |
| Shape of cross section | Thin mountain range with ruggedness | Triangle | Rectangle |

The test pieces were 10×10×40 cm from the reinforced concretes of the ratio of water/cement: 0.5; the maximum size of the aggregates: 15 mm; and the fiber mixing ratios: 1.0% and 2.0%. The bending tests were carried out by holding the test piece at 5 cm in length from the both ends, and the load was subjected on the two points in the trisections between the holding parts.

It will be appreciated from FIG. 13 that the steel fiber of the invention may bring about the excellent reinforcing effect in comparison with the other two. This effect contributes to the above mentioned rugged waves in addition to the wrinkled surface whereby the surface area is widened and the adhesion to the concrete is heightened and the slip-off resistance is large.

The mixing rates of the steel fiber to the concrete by the volume ratios are shown in Table 2.

TABLE 2

|   | Mixing rate 1% | Mixing rate 2% |
|---|---|---|
| I | 93 Kg/cm² | 120 Kg/cm² |
| II | 85 Kg/cm² | 110 Kg/cm² |
| III | 78 Kg/cm² | 102 Kg/cm² |

It will be noted from Table 2 that if using the steel fiber by the invention, the mixing rate can be greatly decreased in comparison with the existing fibers sheared from the thin plate or with the wrinkled surface only without the waves.

In this connection, the present steel fiber were uniformly dispersed in the concrete matrix prior to mixing by the mixer, and the separator was not required. FIG. 13 shows that the bending strength by the present invention increases almost straightly as mixing rate increases, while those of the other two rapidly increase when the mixing rates are increased. This is why the instant fibers are excellent in dispersion and are mixed at random directions three-dimentionally.

A next reference will be made to a production of the steel fibers for reinforcing the concrete according to the invention. While rotating the cutter 1 of the plain milling cutter provided with a plurality of the cutting edges 2 on the outer periphery thereof, it is moved relatively with the steel ingot material 4 for directly machining the ingot on its surface. In this respect, the ingot 4 for the raw material of the steel fiber is preferable in the low carbon steel, i.e., the mild steel or ultra mild steel from the viewpoint of the processing properties, the abrasion of the tool and the quality of the product. In these raw materials, the annealed or normalized materials are recommended in view of the ductility, and the free cutting steel is suitable for a longer life of the tool. Of course, the special steel as stainless steel may be used.

However, it is insufficient to only cut the ingot on its surface by means of the rotating cutting edge for providing the steel fiber of special properties. The cutting direction, the outer diameter of the milling cutter, the conditions of the cutting edges, the cutting speed, and the relation of the feed Sz and the cut depth t per one cutting tooth are under the specific condition or within the specified range, otherwise the steel fiber is not imparted with the wrinkled surface formed with the rugged waves running along the fiber length. Namely, it is conditioned that the ingot is machined under the down-cut milling by the plain milling cutter of the negative rake angle and the twisted angle with respect to the rotating shaft of the cutter, at the high speed, in the thinner depth of cut, and under the special relation between Sz and t.

At first, the cutting direction of the invention is the down-cut. Besides the general merit of elongating the tool life, the down-cut condition of the invention makes the cross section of the fiber thin, and forms whisker-like section at its one side (see FIG. 1 and FIG. 5), thereby widening the surface area.

For the conditions of the cutting edge, the negative rake angle shown in FIG. 7 is between 0° and −30°, and the twist angle α of the cutting edge to the driving shaft shown in FIG. 8 is between 0° and 60°, that is, the twist angle to the horizontal surface of the ingot is between 0° and 60°. The reason for making the rake angle θ of 0° to −30° is because suited for making the fiber thin and avoiding pitching of the cutting edge and the abrasion of the crater. The twist angle α is an element to determine the direction of the rugged wave 53 to the axis of the fiber, and if the twist angle θ increases, the obliquity of the rugged wave to the axis of the fiber increases, and the shock of the cutting edge to the ingot material can be moderated. The steel fiber 5 shown in FIG. 2 is an example of the twist angle α being around 30° (Sz=0.75 mm, t=0.4 mm θ=0°, V=92.8 m/min) and that of FIG. 3 is another example of the twist angle α being less than that of FIG. 2 (Sz=0.86 mm, t=0.3 mm, θ=−15°, α=15°, V=102 m/min, D=250 mm).

With respect to the outer diameter of the cutter, it is desirable that the cutter has the outer diameter as large as possible. If making it large, the thickness of the fiber 4 is made thin as much, so that the objective mountainous cross section and the rugged wave are easy to be made. FIG. 9(a) and (b) show the examples thereof. In the case of Sz being 0.5 mm and t being 0.5 mm, the steel fiber (a) is thick under the diameter of 100 mmφ and that (b) is considerably thin under the diameter of 250 mmφ.

Figure 10A:
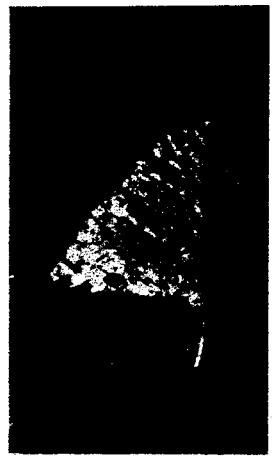
FIG. 10(a) and 10(b) are enlarged cross sections of the fibers resulted from testing the relation of the cutting speed and the cross sectional shape of the fibers.
Figure 10B:

Concerning the cutting speed V, it is preferable that the speed is high appropriately. The cutting speed influences the cross sectional shape of the steel fiber, and if the cutting speed is high, flat fiber formed with the rugged waves may be provided. FIG. 10(a) and (b) show the examples thereof. The both employ the down-cut millings of Sz=t=0.5 mm and θ=0°, and in (a) the cutting speed is 41 m/min and in (b) that is 214 m/min. If the cutting speed is too late, the waves are not generated, and if it is fast, large waves are noted. The optimum cutting speed depends upon the cutter diameter D, Sz, t, etc, but is in general 60 to 130 m/min in view of the productivity and the abrasion of the cutter.

Finally, the feed per one cutting tooth Sz and the depth of cut per one cutting tooth t are important factors to determine the cross sectional area of the steel fiber which is expressed with an equation of $$A = Sz \cdot t$$

When taking into consideration the bending strength of the concrete and the producing efficiency of the steel fiber, it is suitable in this invention that Sz×t falls within the range between 0.1 mm² and 0.5 mm², and in these conditions, if either Sz or t is within the range between 0.1 mm and 2.0 mm and either Sz or t is set more than 0.4, the steel fibers of appropriate thickness easy to have the rugged waves can be provided.

Figure 11A:
FIG. 11(a) and 11(b) are enlarged cross sections of the fibers resulted from testing the relation of the ratio of Sz/t and the cross sectional shape of the fibers.
Figure 11B:
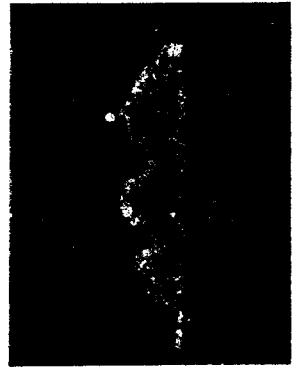

The relation between Sz and t, especially Sz/t or t/Sz are significant in the present invention to making the determined cross sectional shape of the steel fiber. FIG. 11(a) and (b) show the results which the Sz/t ratio gives to the cross sectional shape of the fiber. In the both, the cutting diameter D is 100 mmφ, the rake angle α of the cutting edge is 0° and the cutting speed is 116 m/min, and in (a) Sz=1.08 mm, t=0.25 mm and Sz/t=4, and (b) Sz=0.22 mm, t=1.20 mm and Sz/t=0.2. It will be appreciated from FIG. 11 that if the ratio of Sz/t decreases the fiber is made thin and large waves appear on the cross section. If the cutter diameter D is made large, for example 200 to 300 mmφ, the waves are created even if the ratio of Sz/t (or t/Sz) is more than 1. Accordingly, it is recommended in principle that the value of Sz/t is small, but actually it should be determined in accordance with the cutter diameter in view of the productivity and the abrasion of the cutting edge. When the cutter diameter is more than 200 mmφ, the preferable range of Sz/t (or t/Sz) is more than 1, especially 2 to 3.

FIG. 12 shows the optimum cutting range for producing the steel fibers formed with the waves running on the surface layer, most characterized in the present invention, which was obtained by the relation of Sz or t and the cutting speed. That is, in the conditions that the rake angle $\theta$ of the cutting edge is negative between $0°$ and $-30°$ and the twist angle $\alpha$ is between $0°$ and $60°$ and the cutter diameter D is constant (more than 100 mm$\phi$) and Sz$\times$t is 0.1 to 0.5 mm$^2$, the cut-down milling is carried out in such manner that if either Sz or t is 0.4 mm, the cutting speed V is more than 90 m/min (point b), and if either Sz or t is more than 0.9 mm, the cutting speed is more than 30 m/min (point a), and if either Sz or t is between 0.4 mm and 0.9 mm, the lower limit of the cutting speed is within the range between 30 l m/min and 90 m/min. Thus, the cutting speed is made faster in proportion to the lower value of either Sz or t. For example, if Sz=0.9 mm and t=0.3 mm in the plain milling cutter of $\theta=-15°$, $\alpha=15°$ and D=250 mm$\phi$ and if the cutting speed is more than 30 m/min, the waves are formed, and if Sz=t=0.4 mm and if the cutting speed is more than 90 m/min, the rugged waves are generated. In order to emphasize the ruggedness of the rugged waves, it is sufficient to use one of the parameters of heightening the degree of "negative" of the rake angle, enlarging the diameter D of the cutter, and accelerating the cutting speed V.

In any way, when the ingot material 4 is subjected to the above mentioned specific conditions, the very thin surface layer 4' (for example 30 to 40 $\mu$m) of the ingot 4 is chipped with the cutting edge 2 and when the cutting edge 2 is moved with respect to the ingot, the great plastic flow is caused and the surface is gathered and tied up, so that the cut steel is flown off in a form of a needle shaped chip of the close fabrication effected with considerably large workhardening and imparted with strength (especially tensile strength). Simultaneously, since the chipped surface is annealed at the cutting temperature and is subjected to the air cooling, the surface is covered with the oxidized film in blue. At this time, a phantom cut cross section of the steel fiber is almost triangular, however, since the cutting is in actual carried out in the above mentioned cutting conditions, cutting direction, outer diameter of the cutter, cutting speed and the relation of Sz and t, depressions caused by the unstable phenomena are repeated at time when a thin layer 4' is gathered and tied up as shown in FIG. 9(b). In such a way, the free side surface not contacted with the cutting edge is formed with the wrinkled surface 52 and the rugged waves 53. Thus, the cut chip turns out the steel fiber 5 having as a whole the mountain range like cross section of uniformly thick and wide ruggedness.

Figure 14:
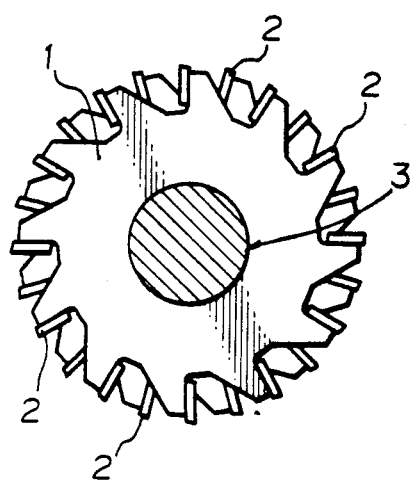
FIG. 14 is a side view showing another embodiment of the milling cutter suited for the inventive process.
Figure 15:
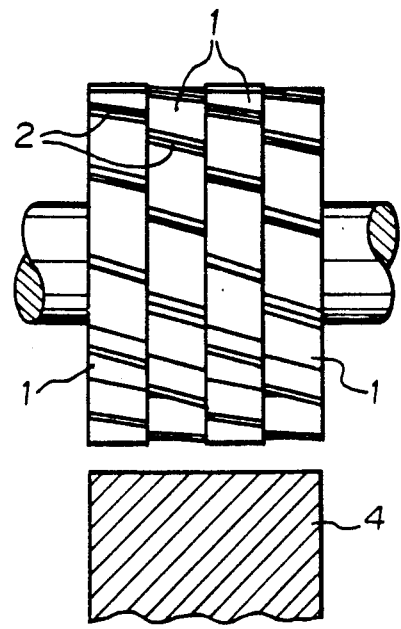
FIG. 15 is a front view of the above.

The cutter to be employed in the instant invention may be single as shown in FIG. 8, but industrially if a plurality of the cutters 1 are mounted in parallel on the same shaft as shown in FIG. 14 and FIG. 15, the great number of steel fibers corresponding in length to the width of the cutting edge 2 are produced concurrently to heighten the productivity. In this instance, the adjacent cutting edges 2 are mounted in deviation at the mounting position so that the steel fibers of the length of the cutting edge 2 are produced from the ingot.

We claim:

1. A reinforcing material for mixing into concrete to input high strength thereto produced by directly cutting the surface of a steel block using a milling cutter, said material comprising a flat, needle-like steel fiber having a flat face and, opposite the flat face, a surface formed of a plurality of fine wrinkles and a plurality of rugged, uneven waves substantially deeper than the fine wrinkles, running along the axial direction of said fiber on the wrinkled surface, the flat face, and the surface opposite the flat face, when the fiber is viewed in cross-section, forming a long and narrow shape which is tapered toward the flat face, and produced by:
    preparing a plain milling cutter having a diameter and teeth with cutting edges, each having a rake angle between $0°$ and $-30°$ and a twist angle between $0°$ and $60°$, said diameter being greater than 100 mm $\phi$;
    setting a feed rate $S_z$ mm per tooth of a steel ingot and a depth t of cut per tooth such that any one of $S_z$ and t is more than 0.4 mm, both $S_z$ and t are in the range of 0.1 mm to 2.0 mm, $S_z$/t is more than 1.0 and $S_z$ times t is 0.1 to 0.5 mm$^2$; and
    machining said ingot material with the cutter rotating such that the teeth at the point of contact are moving in the same direction as the feed of the material, wherein the machine operation is carried out in conditions that if either $S_z$ or t is 0.4 mm, the cutting speed is set at more than 90 m/min, and if either $S_z$ or t is more than 0.9 mm, the cutting speed is set at more than 30 m/min, and if either $S_z$ or t is between 0.4 mm and 0.9 mm, the cutting speed is heightened in proportion to the decreasing value of either $S_z$ or t, whereby needle-like steel fibers are directly produced from the ingot material having wrinkled surfaces formed with a plurality of rugged waves running along an axial direction of the fiber.

2. A reinforcing material as defined in claim 1 wherein said rugged, uneven furrows are oblique to the axis of the fiber.

3. The reinforcing material defined by claim 1 having a whisker-like projection formed at one side of the flat face and extending along the length of the fiber.

* * * * *